UNITED STATES PATENT OFFICE.

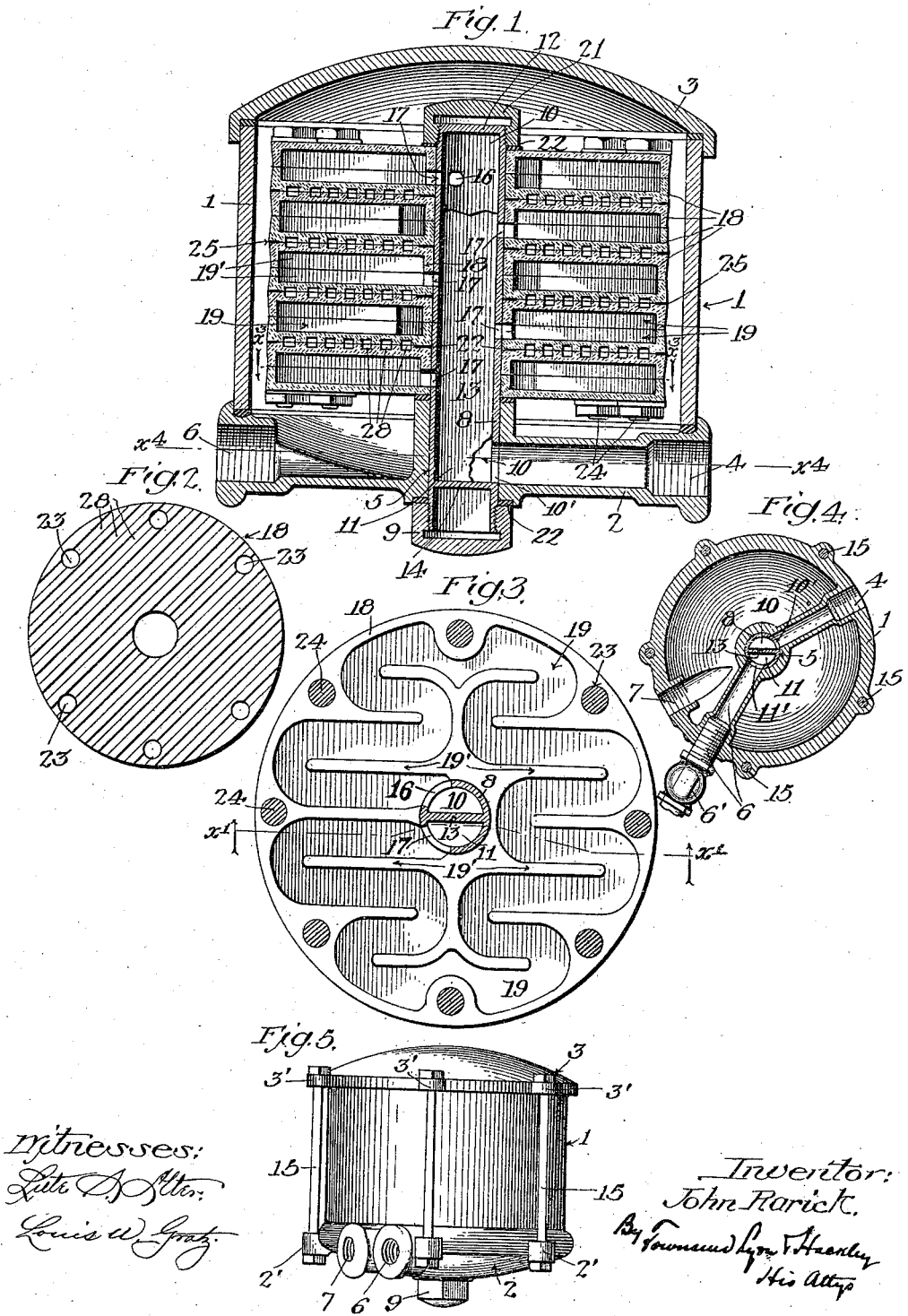

JOHN RARICK, OF UPLAND, CALIFORNIA.

AUTOMATIC HOUSEHOLD-FILTER.

984,704.  Specification of Letters Patent.  Patented Feb. 21, 1911.

Application filed March 31, 1910. Serial No. 552,715.

*To all whom it may concern:*

Be it known that I, JOHN RARICK, a citizen of the United States, residing at Upland, in the county of San Bernardino and State of California, have invented a new and useful Automatic Household-Filter, (Case A,) of which the following is a specification.

One object of the present invention is to provide a household filter which will be of large capacity, effective in operation and durable in use.

Another object of the invention is to provide such a filter with means whereby it may be quickly and conveniently flushed or washed out when required.

A further object of the invention is to provide in a filter, means whereby a large filtering area is provided, the filtering surface being effectually supported notwithstanding its large area.

Other objects of the invention will appear hereinafter.

The accompanying drawings illustrate the invention, and referring thereto:—

Figure 1 is a vertical section of the filter. Fig. 2 is a plan of one of the filter elements. Fig. 3 is a horizontal section of one of the filter elements. Fig. 4 is a horizontal section on line $x^4$—$x^4$, Fig. 1. Fig. 5 is a side elevation of the filter.

The filter comprises a case formed of a cylindrical shell 1, a body member 2, and a top member 3 on said case 1, and filter means inclosed within said case. Top and bottom members 2, 3 are provided with lugs 2', 3' to receive bolts 15 for fastening the parts of the case together. The bottom member 2 is provided with an inlet connection 4 at one side thereof communicating with a central boss or chamber 5. A flushing outlet 6 provided with valve 6' is also provided in said bottom member communicating with said central chamber at the other side thereof. An outlet 7 for the filtered water extends from the interior of the case through the bottom member 2. A vertical tube 8 extends within the central chamber 5 and is screw threaded at its lower end to receive a screw cap 9, said tube being closed at its upper end by a plug 12 and near the bottom end by a plug 14 and being divided by a vertical partition 13 into two vertically extending passages 10 and 11 on opposite sides of said partition. Said passages 10 and 11 communicate respectively through side ports 10' and 11' with the ducts 4 and 6 aforesaid, and the vertical tube 8 is provided on one side of the partition 13 with a vertical series of openings or ports 16 communicating with the passage 10 in said tube, and on the other side of the partition with a vertical series of openings or ports 17, communicating with the passage 11 in said tube.

The filter means proper comprises a series of filter elements, each formed as a box or chamber preferably in the form of a hollow disk, said element being formed of two members 18 of identical construction, each member being provided with channels or recesses 19, in its inner face and intervening ribs 19', said channels being identical or corresponding in the two members 18, so that when said members are placed with their channel faces in contact, the aforesaid channel will register to form substantially a single channel for the two members 18. Each member 18 is preferably formed of suitable porous stone with the channels 19 cut therein, the pair of members 18 being placed face to face as stated and cemented together in any suitable manner. The series or set of filter elements thus formed are placed one above another and surround the tube 8, each of said elements having a central bore or opening to fit said tube 8, and the channels 19, in said filter element communicating at its ends with the openings or ports 16, 17 in said tube. When the parts are thus assembled the ports or openings 16 in the tube 8 establish communication from the inlet passage 10 in said tube to the chambers or channels 19 in the filter elements 18, and the ports or openings 17 in said tube establish communication to the flushing outlet passage 11 in said tube from the channels 19 in the filter elements 18, the communication to the inlet and outlet passages in tube 8 being at opposite ends or different parts of the tortuous channels 19. A screw cap 21, screwing on the upper end of the tube 8 holds the vertical series of filter members in place, gaskets or packing washers 22 being placed between the filter members and on the top filter member and below the bottom filter member, around the tube 8. Members 18 are further provided with perforations 23 near their peripheries, to receive clamping bolts 24, and rings 25 may be provided between the members 18 adjacent to said bolts to aid in sustaining the pressure of the clamping bolts. Each filter member 18 is grooved as at 28 on its outer faces, both upper and lower, to enable the passage of the water from between the filter members to the space or chamber around the stack of filter members. The channels 19 formed in the inner face of the members 18 form a tortuous passage leading from the inlet opening 16 to the outlet opening 17 in the tube 8, said opening 17 communicating through channel 11 with flushing outlet 6.

The operation is as follows:—Water is supplied at the inlet opening 4 and passes into the tube 8 at one side of the partition 13 into chamber 10 and flows thence through the openings 16 into the passages 19 in the filter member. The other ends of said passages communicate with openings 17 leading through the other side of the tubular member 8 to the outlet 6, but said outlet is normally closed by the valve 6' so that the water is forced to pass through the walls of the filter members and enters the chamber in the case around the filter members, flowing between the filter members along the top and bottom walls thereof and in the grooves 28 and finally passing out through outlet connection, the said chamber being allowed to fill up and the water being drawn off as required. When it is desired to flush the filter, to clean the same, the valve 6' is opened and the water from the inlet may then pass through the channels 19 in the filter elements and through the openings 17 and the tubular member 8 at the other side of the partition to the flushing outlet 6, washing out all the sediment or dirt that has accumulated on the interior of the filter elements. The ribs 19' between the channels 19 in the filter elements serve to support the top and bottom walls of the filter elements against the pressure of the clamping bolts and screw means, while providing for exposure of large surface for filtering.

What I claim is:

1. A filter comprising a stack of filter elements, each formed of porous material and having interior channels with intervening ribs, means clamping said filter elements together, a tube extending centrally in the stack of filter elements and provided with an inlet passage and a flushing outlet passage, said tube and filter elements being provided with openings establishing communication from the inlet passage in the tube to the channels in the filter elements and with an opening establishing communication from another part of the channels in each of the filter elements to the flushing outlet passage in said tube, an inclosing case surrounding the stack of filter elements, and outlet means therefrom.

2. A filter comprising a stack of filter elements, each formed of porous material with an intervening tortuous channel, a tube extending through the stack of filter elements and having a partition, and provided with supply inlet and flushing outlet on opposite sides of said partition, said tube having openings at opposite sides of said partition communicating respectively with the ends of the channel in each filter element.

3. A filter comprising a stack of filter elements, each formed of porous material with an intervening tortuous channel, a tube extending through the stack of filter elements and having a partition, and provided with supply inlet and flushing outlet on opposite sides of said partition, said tube having openings at opposite sides of said partition communicating respectively with the ends of the channel in each filter element, and means for clamping the filter elements together, each filter element having grooves in a wall thereof next to the adjacent filter element.

4. A filter element comprising two members of porous material having corresponding ribs and cemented together face to face with their ribs in correspondence forming a tortuous channel, said members having a central bore, in combination with a tube, extending and fitting within said central bore in the filter element and provided with a supply passage and with a flushing outlet passage and with openings establishing communication from said supply and outlet passages to different portions of the tortuous channels in the filter element.

5. A filter comprising a case having an outlet and provided with a central chamber in its bottom and with inlet and flushing outlet ducts leading to said central chamber, a vertical tube fitting in said central chamber and provided with vertical passages communicating with said inlet and flushing outlet ducts, and a stack of filter elements, surrounding said tube, each formed with a tortuous channel communicating at different portions thereof with the respective vertical passages in said tube, said filter elements being porous to allow water to fill the space within the case around the stack of filter elements.

6. A filter comprising a stack of hollow filter elements, each provided with ribs forming a tortuous channel, a tube extending through said stack and provided with water inlet and outlet means, and with openings communicating with said filter element at different portions of the channel therein to circulate water through the filter, and means for collecting the filtered water from the filter elements.

In testimony whereof, I have hereunto set my hand at Los Angeles, California, this 24th day of March, 1910.

JOHN RARICK.

In presence of—
ARTHUR P. KNIGHT,
FRANK L. A. GRAHAM.